US006549274B1

(12) United States Patent
Arndt et al.

(10) Patent No.: US 6,549,274 B1
(45) Date of Patent: Apr. 15, 2003

(54) METHOD AND DEVICE FOR FLOW ANALYSIS

(75) Inventors: Stefan Arndt, Stuttgart (DE); Christian Heinen, Leinfelden-Echterdingen (DE); Klaus Reymann, Gerlingen (DE); Bodo Ruck, Karlsruhe (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/914,423

(22) PCT Filed: Nov. 24, 2000

(86) PCT No.: PCT/DE00/04170

§ 371 (c)(1),
(2), (4) Date: Dec. 17, 2001

(87) PCT Pub. No.: WO01/48489

PCT Pub. Date: Jul. 5, 2001

(30) Foreign Application Priority Data

Dec. 28, 1999 (DE) .......................... 199 63 393

(51) Int. Cl.[7] .............................. G01P 3/36; G01F 1/00
(52) U.S. Cl. .......................................... 356/28; 73/861
(58) Field of Search ............................. 356/28; 73/861

(56) References Cited

U.S. PATENT DOCUMENTS

| 4,201,467 A | * | 5/1980 | Hartmann et al. | ............. 356/28 |
| 4,804,263 A | * | 2/1989 | Schodl | ........................ 356/28 |
| 4,919,536 A | * | 4/1990 | Komine | ....................... 356/28 |
| 4,989,969 A | * | 2/1991 | Siebert et al. | ................ 356/28 |
| 5,491,642 A | * | 2/1996 | Wormell et al. | .............. 356/28 |
| 5,751,410 A | * | 5/1998 | Roehle et al. | ................ 356/28 |
| 5,883,707 A | * | 3/1999 | Arndt et al. | .................. 356/28 |

FOREIGN PATENT DOCUMENTS

| DE | 195 02 993 | 8/1995 |
| DE | 197 37 933 | 3/1998 |

OTHER PUBLICATIONS

Goss et al., "Two–color particle velocimetry," ICALEO '89: Optical Methods in Flow and And Particle Diagnostics, Orlando, Fl., USA, Oct. 15–20, 1989 Bd. 1404, pp. 99–109, XP000997975, Proceedings of the SPIE—The International Society for Optical Engineering, 1990, USA ISSN: 0277–786X.*

Ghamele et al., "A Method for Validating two–dimensional flow configurations in particle streak velocimetry," Transactions Of the ASME, Journal Of Fluids Engineering, Jun. 2000, ASME< USA, Bd. 122, Nr. 2, pp. 438–440, XP000997966, ISSN: 0098–2202.*

Post et al., "Two–Color Particle–Imaging Velocimetry Using a Single Argon–Ion Laser," Experiments in Fluids, DT, Springer Verlag. Berlin, Bd. 16, Nr. 3/04, Feb. 1, 1994, pp. 263–272, XP000450979, ISSN: 0723–4864.*

* cited by examiner

Primary Examiner—Stephen C. Buczinski
(74) Attorney, Agent, or Firm—Kenyon & Kenyon

(57) ABSTRACT

A method and a device suitable for carrying out the method are proposed for analyzing and quantifying flows, in particular for the three-dimensional determination of flow velocity components or the three-dimensional visualization of flows in fluids or gases. For this purpose, electromagnetic waves, especially light, are detected, which at least partially emanate from or are scattered by particles that are contained in the detection space and that characterize the flow to be analyzed, the waves being detected using at least one detection device, in the form of two-dimensional images that are recorded in a frequency-selective or frequency-band-selective manner, from which the flow is determined. The illuminating device for this purpose generates at least two, at least approximately parallel light sheets, arranged in spatial succession, generated in temporal succession, having electromagnetic waves of different frequencies or different frequency spectrums, which scan the detection space at least in areas.

32 Claims, 4 Drawing Sheets

METHOD AND DEVICE FOR FLOW ANALYSIS

FIELD OF THE INVENTION

The present invention relates to a method and a device for the analysis and quantification of flows, in particular for the three-dimensional determination of flow velocity components or of the three-dimensional visualization of flows in fluids or gases.

BACKGROUND INFORMATION

Measuring flow velocities and visualizing flows have broad applications, especially in aerodynamics and in fluid dynamics, in the analysis and optimization of the most varied flow phenomena, as well as in the area of industrial process engineering and production technology. In this context, mechanical, electromechanical, as well as optical flow measuring methods are used. The existing optical flow measuring methods, in this regard, can be roughly subdivided into point, surface, and spatial measuring methods.

In this way, the surface measurement of intermittent flow processes or of spatial turbulence structures has been possible heretofore using so-called total-field methods. These methods detect in liquid or gas flows the scattered light of particles suspended therein in light sections or a light-section sheets.

In addition, in the case of surface measuring methods, so-called "Particle Image Velocimetry (PIV)" and the "Particle Tracking Method" are widely used. In this context, the shift of suspended particle groups or of individual particles that are suspended in a medium that is to be analyzed is determined with respect to the flow conditions using correlation, or tracking, algorithms.

In addition, in surface measuring methods, it is known to use two different, colored light sections, at the same time, for determining the normal velocity components of the suspended particles perpendicular to the light-section sheets. In this regard, reference should be made, by way of example, to I. Kimura and Y. Kohno, "Measurement of Three-dimensional Velocity Vectors In a Flow Field Based on Spatio-Temporal Image Correlation," 3rd International Symposium FLUCOME, pp. 609–615, (1991), C. Brucker, "3-D PIV Via Spatial Correlation in a Color-Coded Light-Sheet," Experiments in Fluids, 21, pp. 312–314, Springer Publishing House, 1996, and A. Cenedese and A. Paglialunga, "A New Technique For the Determination of the Third Velocity Component with PIV," Experiments in Fluids, 8, pp. 228–230, Springer Publishing House, 1998.

In M. Raffel et al., "Analytical and Experimental Investigations Of Dual-Plane Particle Image Velocimetry," Optical Engineering 35, 7, pp. 2067–2074, (1996), the further suggestion is made to spatially transpose a single light section into two light-section positions using a chopper disk.

Finally, from F. Dinkelacker et al., "Determination of the Third Velocity Component with PTA Using an Intensity Graded Light Sheet," Experiments in Fluids 13, pp. 357–359, Springer Publishing House, 1992, it is already known to modulate the intensity of individual thicker light sections along a light section depth.

Summarizing, the cited surface methods make it possible to determine the velocity components of the suspended particles within a plane and therefore also to analyze the flows in the fluid or gas to be examined. However, they are only capable of analyzing three-dimensional flows in one plane and not in a volume.

Among the spatial measuring methods, i.e., those measuring methods which permit the analysis of flows in a volume, stereoscopic methods should be mentioned, which are known, by way of example, from R. Racca and J. Dewey, "A Method for Automatic Particle Tracking in a Three-Dimensional Flow Field," Experiments in Fluids 6, pp. 25–32, Springer Publishing House, 1988, or which function using stereoscopic lenses, as proposed by T. Chang et al., "Application of Image Processing to the Analysis Of Three-Dimensional Flow Fields," Optical Engineering, 23, 3, pp. 282–287, (1984). In this method, the flow field is recorded from different directions using two to four cameras.

All of the above-mentioned spatial measuring methods have in common that they have a continual illumination of the flow field to be analyzed and/or that the volume to be analyzed is recorded from different directions using a plurality of image detectors. Therefore, these methods are only partially applicable for practice where setup times, optical accessibility, and limitations regarding direction of observation play an important role. The latter, furthermore, also applies to holographic methods.

Finally, from C. Brücker, "Digital-Particle-Image-Velocimetry (DPIV) in a Scanning Light Sheet: 3-D Starting Flow Around a Short Cylinder," Experiments in Fluids 19, pp. 255–263, Springer Publishing House, (1995), a spatial measuring method is known, in which the volume to be analyzed is scanned using a drum scanner having a monochromatic laser beam. In this context, the scattered light characterizing the flow and scattered in the suspended particles is recorded as a function of time using a high-speed camera. For this purpose, each individual light-sheet position in the volume to be analyzed is separately recorded, so that the recording of the flow field is tied to the image repetition frequency of the camera used. In addition, the separate recording of each individual light-sheet position in the detection space generates a very large quantity of data having correspondingly large memory requirements.

The objective of the present invention is to carry out the measurement of flow velocities and the analysis of flows in gases and liquids within a detection space in a three-dimensional manner and at the same time more simply, more rapidly, and more cost-effectively.

SUMMARY OF THE INVENTION

In contrast to the related art, the method and the device according to the present invention have the advantage of relatively small equipment expense, especially with regard to the detection device. Furthermore, it is advantageous that only one observation direction, i.e., only one CCD color camera, is required.

In addition, the method according to the present invention has the advantage that the data sets that arise are relatively small, and that they therefore can be processed and evaluated easily and straightforwardly.

Finally, the attainable resolution, i.e., measuring precision, in the method according to the present invention is now no longer tied, for example, to the image repetition frequency of a high-speed camera, but is only limited by the distance and the temporal difference in the generation of two adjacent, parallel light sheets which are arranged in spatial succession.

Therefore, it is particularly advantageous if a multiplicity of light sheets having light of different colors or different frequency spectrums are used, these colors potentially lying both in the visible frequency range as well as in the near ultraviolet or near infrared range. In this case, for recording within the detection space the light that is scattered by or emanating from the particle characterizing the flow, a conventional and therefore relatively economical CCD color camera is suitable.

Suitable as the electromagnetic waves, or light, is, on the one hand, a polychromatic light beam, polychromatic here being understood to be a light beam which covers a wider frequency spectrum in the visible frequency range and appears, for example, to the human eye as white or as a secondary color, and, on the other hand, if appropriate, a plurality of light beams of this type, which make available in each case one or a plurality of different colors, i.e., primary colors.

In this context, the light source for this or these light beams can be one or a plurality of lasers or an arrangement of laser diodes, which, if necessary, each generate different colors, secondary or primary colors (red/yellow/blue). In addition, projection lamps having point-plotting light surfaces are also used.

Particularly advantageous are one or a plurality of polychromatic laser beams, because in this manner a particularly good collimation and spatial resolution, i.e., separation, of the individual light sheets in the detection space is achieved.

To assure that, in the raster scanning of the detection space through the parallel light sheets at the location of the image detectors, i.e., of the detection device, the depth of focus produced is good and always at least substantially consistent, it is advantageous if the detection device or the CCD color camera used is provided with an additional device for the continuous or step-by-step adjustment of the depth of focus. In this context, the adjustment of the depth of focus, for example, using a control unit, is correlated with the raster scanning of the detection space via the light sheets that are generated in temporal succession.

Well suited to evaluate the images of the detection space recorded by the CCD color camera, i.e., the detection device, are generally known algorithms and evaluation methods from "Particle Image Velocimetry," which additionally take into account the color information. However, "Particle Tracking Methods" can also be used.

Overall, in the aforementioned methods known to the worker skilled in the art, it is only necessary to expand them with respect to color recognition or frequency or frequency band recognition and with respect to the evaluation of the frequency or color information, for quantifying the normal velocity components.

A simple and rapid filtering of the polychromatic light made available by the light source is advantageously carried out using a generally known acoustooptic modulator, which makes possible a color mixing, i.e., the generation of any and all colors, at a color change frequency that extends into the MHZ range.

In addition, it is advantageous to provide in the illuminating device a collimator and a polygon scanner having an attached galvanometer scanner, which make it possible to raster scan the detection space at a high spatial resolution, i.e., at minimal width and clearer spatial separation of the individual adjoining light sheets.

DETAILED DESCRIPTION

Figure 1:
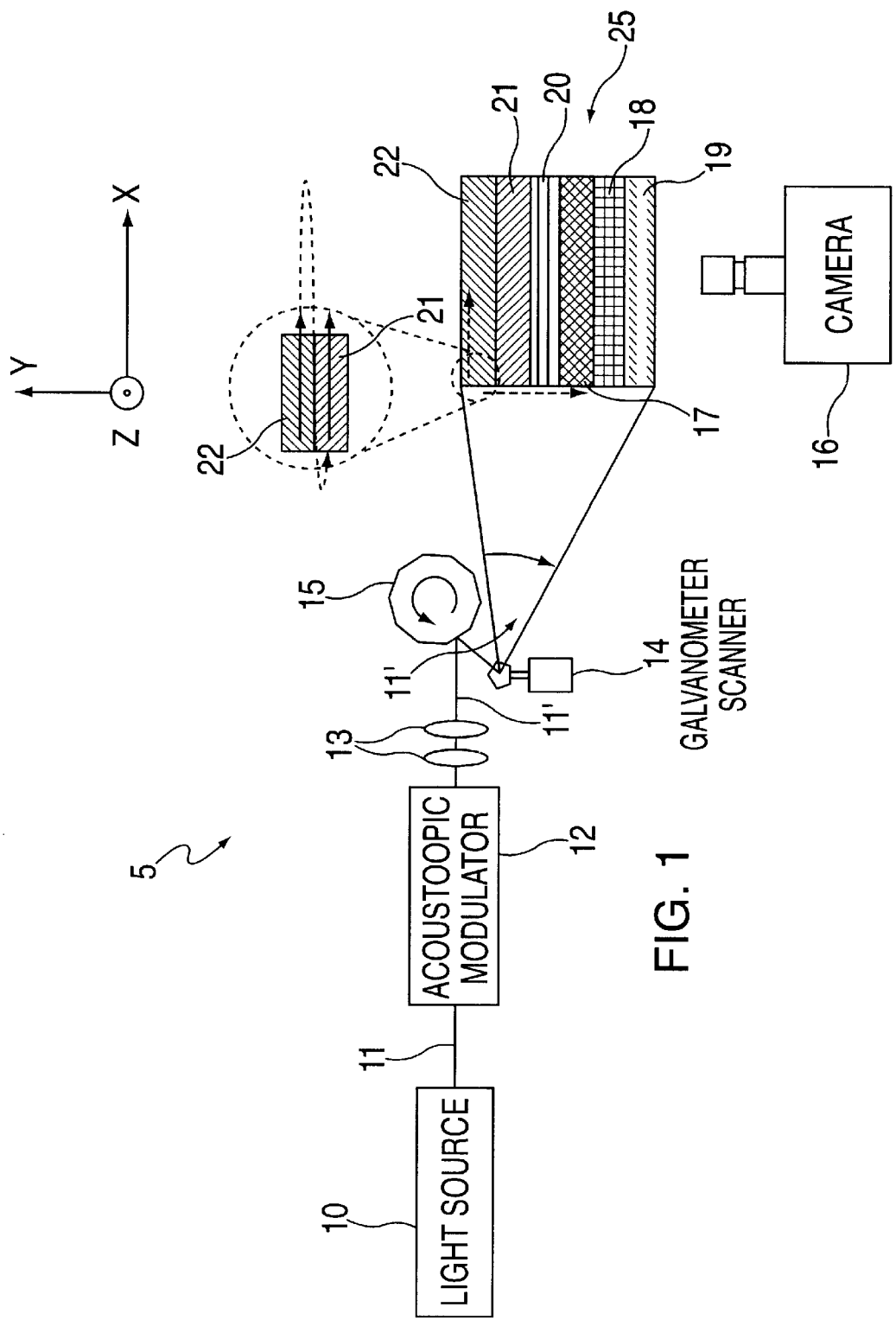
FIG. 1 depicts a schematic sketch of a flow analysis device according to present invention in a top view.

The crux of the method according to present invention is that, using an illuminating device, for example, a light source, for emitting electromagnetic waves in the form of polychromatic light, and downstream optical components, it is possible to generate at least approximately parallel light sheets, that are multi-colored or that vary in their frequency or in their frequency spectrum, which, arranged one after the other spatially and temporally, scan, i.e., raster scan, a detection space 25 or an area of detection space 25, and that during this scanning process one or a plurality of image detectors, i.e., detection devices, for example, a CCD color camera 16, which is arranged on end face 26 of detection space 25, record an image of detection space 25.

For this purpose, as light source 10, in the example discussed, a multicolored light source is used, for example a multicolored laser beam, which functions either in pulsed-mode or continuous-wave operation.

Alternatively, however, the multicolored light beam can also be realized using differently colored laser diodes or a plurality of lasers of different frequencies, which then are superimposed using optical components.

A further possibility for generating a multicolored light beam, in particular a multicolored laser beam 11, arises when fiber lasers are used.

To achieve a staggering of parallel light sheets, arranged one after the other spatially and temporally in the area of detection space 25, further components are provided downstream of light source 10. Thus the color change from one light sheet to the next one takes place, for example, using an acoustooptic modulator 12 or, alternatively, using an integrated-optical color mixer.

Generating the different, adjacent, parallel light sheets then takes place using a collimator 13, which is provided downstream of acoustooptic modulator 12, using a downstream, generally known galvanometer scanner 14, and using a downstream, generally known polygon scanner 15.

These components provided downstream of acoustooptic modulator 12 effect a raster scanning of detection space 25 via monochromatic laser beam 11', emerging from acoustooptic modulator 12, in the form of at least roughly parallel light sheets 17, 18, 19, 20, 21, 22, that are generated in spatial succession and in temporal succession. In this context, the term "monochromatic" is understood only that laser beam 11', in comparison with laser beam 11, has a reduced frequency spectrum and in particular a different color than incident laser beam 11. Thus laser beam 11 can be, for example, white, whereas laser beam 11' is, for example, red, blue, or green. Of course, laser beam 11 can also be green, whereas laser beam 11' then is, for example, blue or yellow.

Light sheets 17, 18, 19, 20, 21, 22 are therefore distinguished in each case by their color as a consequence of the color change effected by acoustooptic modulator 12 on, for example, multicolored or white laser beam 11, that is supplied to the modulator.

In this context, the raster scanning of detection space 25 is preferably carried out such that CCD color camera 16 registers an at least approximately continuous illumination of detection space 25, i.e., of light sheets 17, 18, 19, 20, 21, 22.

Recording the image of the flow space can take place, as an alternative to the image detector, i.e., CCD color camera 16, using a 3-chip special camera furnished with interference filters, for example, a so-called LLT3 camera. In the event this special camera is used, three individual black-and-white sensors are used, which represent the colors red, green, and blue of an RGB image. In this case, the individual colors are then reconstructed in a computer by superimposing the individual images and are depicted in false colors.

This procedure is especially suitable if the only light sources available are those which cover only a small wavelength spectrum, so as therefore to be able nevertheless to realize a larger color spectrum.

Since the distance between the light sheets of the detection device, in particular CCD color camera 16, is continually changing in response to the raster scanning of the detection space using parallel light sheets 17, 18, 19, 20, 21, 22, to assure an at least approximately constant depth of focus, in one preferred embodiment of the present invention, provision is made to assign to the detection device a device for the continuous or stepwise adjustment of the depth of focus and to correlate it, for example via a generally known control unit, with the temporally changing position of light sheets 17, 18, 19, 20, 21, 22 in detection space 25.

The evaluation of the two-dimensional, color images of detection space 25, recorded by the detection device in a frequency- or frequency-band-selective manner, is then carried out either on the basis of one individual recorded image, in which two or more scanning processes are recorded, or on the basis of a plurality of recorded images, preferably recorded in rapid succession, in which in each case one or more scanning processes are recorded.

For evaluating the shift of the particles suspended in detection space 25, or in the liquid or gas contained therein, and thus for determining velocity components $v_x$, $v_y$, $v_z$, which represent directly an image of the local flow conditions predominating in detection space 25, the known methods of "Particle Image Velocimetry", expanded through the evaluation of color information, or the known "Particle Tracking Methods" are used in the example discussed.

In this manner, the positions of suspended particles 30, 31, 32, 33, 34, 35, within individual light sheets 17, 18, 19, 20, 21, 22, can be detected in a way that is entirely analogous to conventional light-section methods.

The positions of these particles 30, 31, 32, 33, 34, 35 in the normal direction (y direction) with respect to light sheets 17, 18, 19, 20, 21, 22, are then clearly generated from the determination of the color of the specific scattered light, because each color clearly assigns a light sheet 17, 18, 19, 20, 21, 22, and therefore a corresponding position in the y direction to particle 30, 31, 32, 33, 34, 35 which is emitting or scattering the light. In this context, the measuring precision in the normal direction is initially stipulated by the width of specific light sheet 17, 18, 19, 20, 21, 22, but it can be increased by an optional analysis of the intensity distribution of the scattered light signals of two adjoining light segment sheets 17, 18, 19, 20, 21, 22, as a function of the y direction (normal direction).

In order to attain a higher temporal resolution capacity, one advantageous embodiment of the present invention also provides that two light sheets, arranged very rapidly one after the other, scan identical detection space 25. A procedure of this type can be realized, for example, by providing a corresponding second illuminating device, or by making available, in addition to a, for example, monochromatic incident laser beam 11', a second, differently colored, incident laser beam, downstream of which the appropriate optical, i.e., acoustooptic components, are arranged, so that the second laser beam, in comparison to first laser beam 11', is generated in a spatial offset, and both laser beams bring about an offset of light sheets spatially and temporally, such that two light sheets generated in alternating fashion scan the same detection space 25 one immediately after the other.

The exemplary embodiment of the present invention discussed above is explained below in greater detail on the basis of FIG. 1. FIG. 1 depicts a flow analysis device 5 having a light source 10 in the form of a multicolored laser, which generates a multicolored laser beam 11. This multicolored laser beam 11 is directed at acoustooptic modulator 12, which in a generally known manner filters out defined frequencies or frequency ranges from the supplied multicolored light and therefore emits a monochromatic laser beam 11'. For this purpose, acoustooptic modulator 12 specifically brings about either a color mixing or a filtering of the supplied light. Monochromatic laser beam 11', emitted from acoustooptic modulator 12, therefore changes its color in very rapid succession. Known acoustooptic modulators make it possible to undertake this color change, for example, in a frequency range of 100 kHz up to 1 MHZ.

A multicolored laser beam 11 of this type is, for example, a laser beam whose color is composed of a plurality of primary colors.

The colors red, green, and blue are preferably used, which are generated, for example, by an argon-krypton laser, which emits multicolored laser beam 11. Acoustooptic modulator 12 then undertakes a modulation of the intensities of the individual supplied colors in multicolored laser beam 11 such that a high-frequency color change arises and, in each case, a monochromatic laser beam 11' is emitted.

Downstream of acoustooptic modulator 12, collimator 13 is then provided, which is configured, for example, as a lens system and which can adjust the thickness of individual light sheets 17, 18, 19, 20, 21, 22. The thickness of the individual light sheets preferably lies in the range of 100 µm to 1 mm, in particular 500 µm to 1 mm.

The number of light sheets 17, 18, 19, 20, 21, 22, arranged one after the other, is at least three, but usually a multiplicity of, for example, 100 to 200 light sheets is provided. Detection space 25, has, for example, dimensions of 10 cm×10 cm×10 cm.

Polygon scanner 15, provided downstream of collimator 13, assures the generation of individual light sheets 17, 18, 19, 20, 21, 22 from monochromatic laser beams 11', which are supplied in temporal succession. Alternatively, in place of polygon scanner 15, it is also possible to use one or a plurality of generally known cylinder lenses. Polygon scanner 15 for this purpose preferably rotates at 20,000 to 60,000, in particular 40,000, revolutions/min. The scanning rate is advantageously adjusted to the measuring task and it can, in principle, be increased into the MHZ range, if necessary using optical components.

Overall, monochromatic laser beam 11', high-frequency modulated in its color, is conveyed in one sheet so rapidly that CCD color camera 16, provided as image detector, records a continuous illumination of individual sheets.

Galvanometer scanner 14, provided downstream of polygon scanner 15, functions to shift the differently colored, parallel light sheets, so that they, being at least approximately parallel, and arranged in spatial succession, scan detection space 25, the colors of these parallel light sheets 17, 18, 19, 20, 21, 22, arranged one behind the other, at the same time, being different.

In this connection, it is important that the shift of light sheets 17, 18, 19, 20, 21, 22, takes place synchronously with the color change of acoustooptic modulator 12, so that a volume arises of differently colored light sheets 17, 18, 19, 20, 21, 22, lying at least approximately parallel to each other. For this purpose, appropriate, undepicted, generally known control components are provided.

The CCD color camera is installed for recording the image of detection space 25 at end face 26 of detection space 25.

Figure 2:
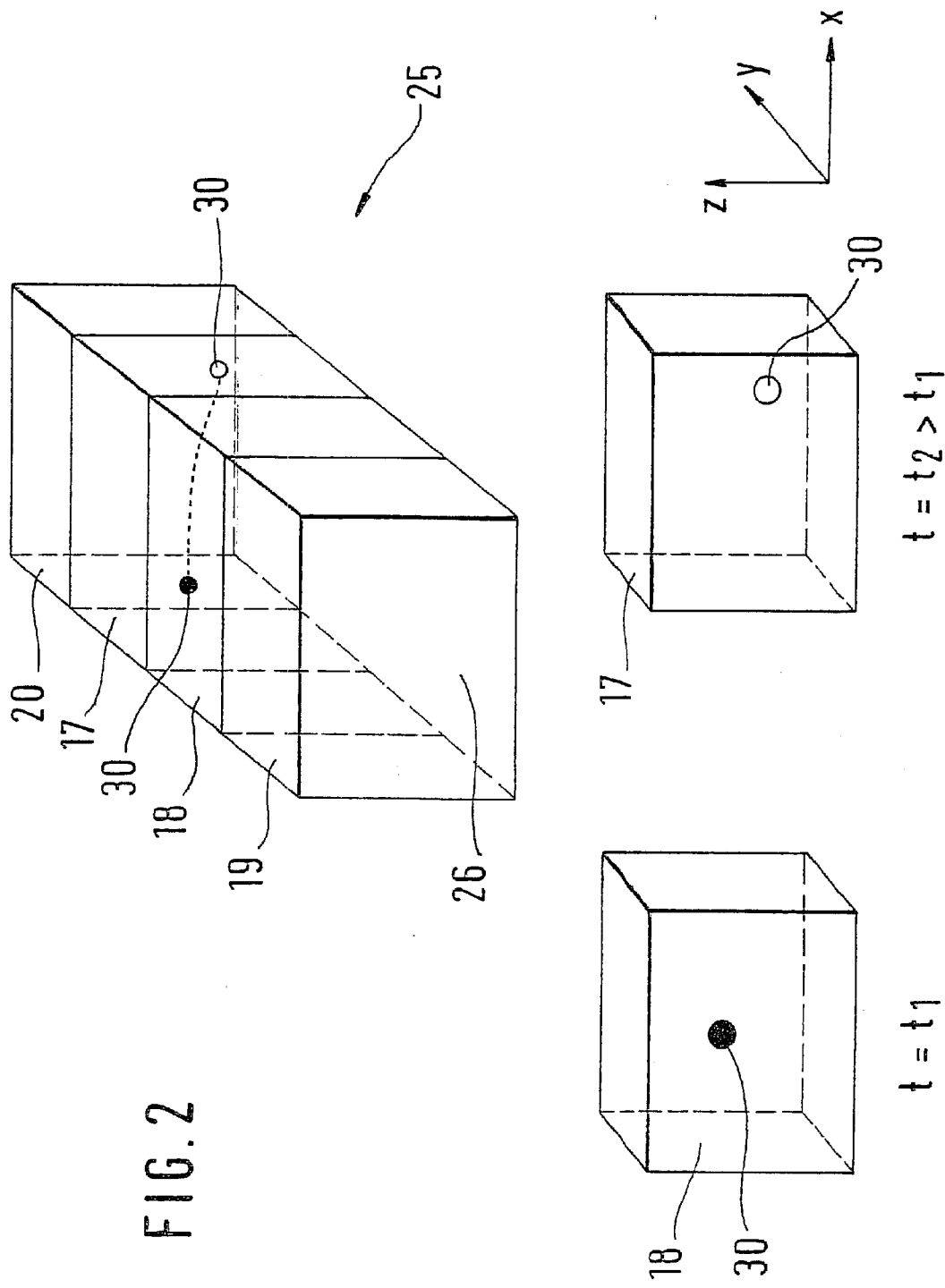
FIG. 2 depicts a three-dimensional representation of a segment of the detection space having in addition two segments of two separate light sheets at two different points in time.

FIG. 2 illustrates once again the illumination of a segment of detection space 25 using different light sheets. Specifically, in FIG. 2, four adjoining light sheets 17, 18, 19, 20 are depicted, which are spatially offset with respect to each other and are illuminated in temporal succession using light of different colors. Moreover, by way of example, one single scattered particle 30 is provided, which moves between two time points $t_1$ and $t_2$ from a first position in light sheet 18 to a second position in light sheet 17. For emphasis, this is depicted once again separately in FIG. 2.

The x and z coordinates of the position of scattered particle 30 in detection space 25 are directly generated from the image of CCD color camera 16. From the different color of scattered particle 30, resulting from its position in two different light sheets 18 and 17, at times $t_1$ and $t_2$, on the one hand, it is then initially possible to determine the position of particle 30 in the y direction at times $t_1$ and $t_2$ and, on the other hand, from the information concerning time difference $\Delta T$ between $t_1$ and $t_2$, in addition to the flow velocities of scattered particle 30 in the x and z directions, the flow velocity component in the y direction is also determined.

Figure 3:
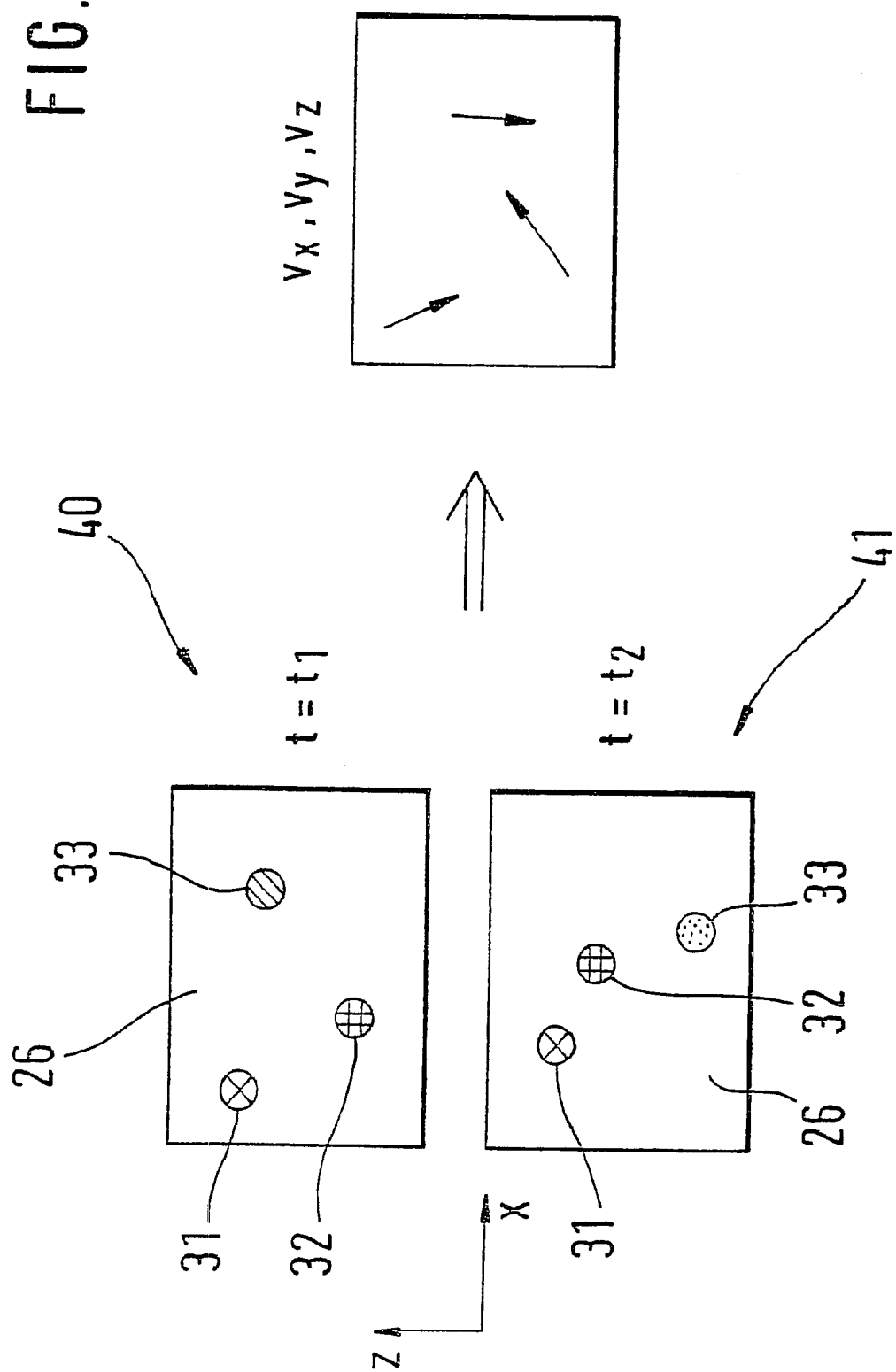
FIG. 3 depicts two images recorded one after the other at the end face of the detection space for calculating the flow velocity components of the individual particles.

FIG. 3 illustrates this schematically in the example of two images recorded one after the other at time points $t_1$ and $t_2$ at end face 26 of detection space 25 by CCD color camera 16. In this context, scattered particles 31, 32, 33, suspended in detection space 25, generate a scattering of the impinging light, the different symbols for scattered particles 31, 32, 33, in FIG. 3, standing for the different colors of these scattered particles 31, 32, 33.

Specifically, both images at time points $t_1$ and $t_2$ in FIG. 3 stand for two entire scanning processes of detection space 25, in other words, all of the parallel, differently colored light sheets were generated precisely twice, and two images of detection space 25 were recorded. In each image, a complete scanning process is therefore recorded.

From the knowledge of time difference $\Delta t = t_2 - t_1$ and from the changes in the positions of scattered particles 31, 32, 33 in the x direction and in the z direction, their velocity components can immediately be calculated in the x and z directions. The velocity components in the y direction of individual scattered particles $v_y = \Delta y / \Delta t$ is then yielded by evaluating the colors, i.e., the changes in color, of scattered particles 31, 32, 33 between times $t_1$ and $t_2$.

The precision of the determination of velocity component $v_y$, in this context, is a function of the thickness of the individual light sheets.

Figure 4:
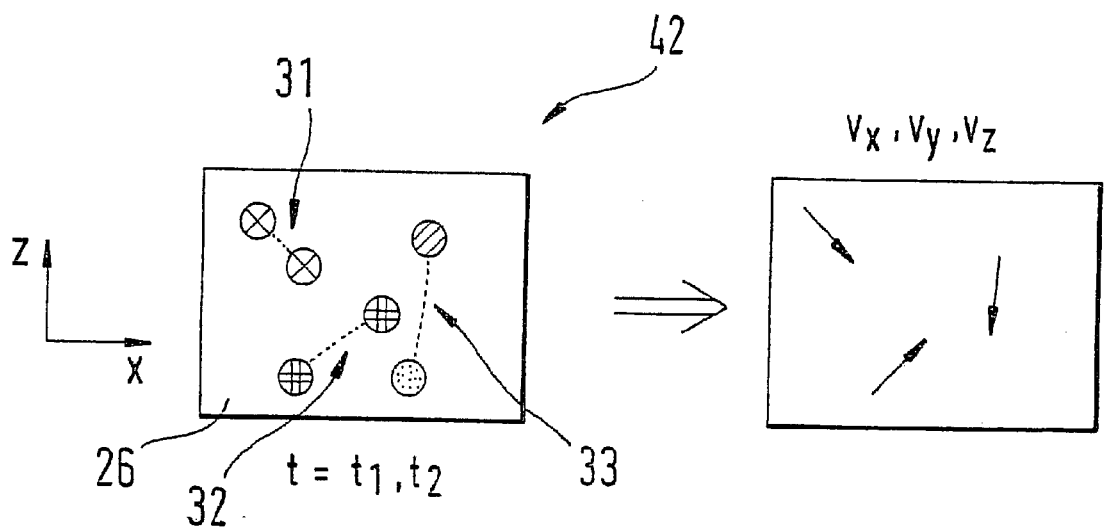
FIG. 4 depicts an individual image of the detection space in two exposures made at different times.

FIG. 4 depicts a typical recorded image in which two complete scanning processes have been recorded in one image of CCD color camera 16. These two records were taken in rapid succession at time points $t_1$ and $t_2$. Typical rates of repetition of the scanning processes of detection space 25, in this context, lie within the range from 100 Hz to 1 kHz, corresponding to the flow velocities usually observed in fluids in the order of magnitude of m/sec. However, using the method discussed, scanning rates in the MHZ range are also possible in principle in this case as well.

The size of scattered particles 30, 31, 32, 33, 34, 35 typically lie in an order of magnitude of 1 $\mu$m to 20 $\mu$m.

In FIG. 4, different symbols for scattered particles 31, 32, 33, as in FIG. 3, stand for different colors of these particles. In this context, the same symbols mean specifically that the individual scattered particle is located in the same light sheet at times $t_1$ and $t_2$.

Figure 5:
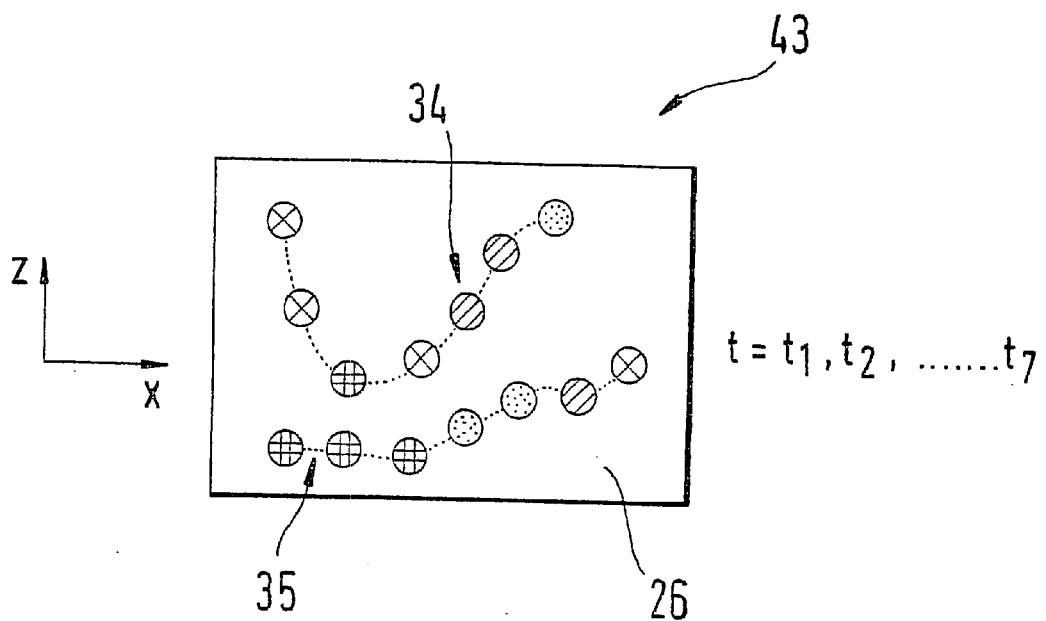
FIG. 5, in a continuation of the detection space depicted in FIG. 4, a multiplicity of sequential scanning processes.

Furthermore, it should be noted that FIGS. 3 through 5 only serve illustrative purposes and are radically simplified diagrammatic sketches.

FIG. 5, as an extension of FIG. 4, depicts a recorded image in which a total of seven complete scanning processes have been recorded at time points $t_1$, through $t_7$. Thus in FIG. 5, each of two depicted scattered particles 34 and 35 was recorded by a total of 7 scanning processes, so that for each scattered particle 34, 35, a series of sequential image points results. Within this series of image points, once again the color of the particle characterizes its position in detection space in the y direction.

Furthermore, it should be noted that the records according to FIG. 3 can be evaluated using cross correlation methods modified in the usual manner, as they are used in "Particle Image Velocimetry."

The records in accordance with FIGS. 4 and 5 can also be evaluated using modified correlation algorithms, especially the autocorrelation, i.e., the "Particle Tracking Method."

Finally, it should be emphasized that the evaluation in the case of FIG. 5 can take place even without evaluation algorithms, simply through a qualitative spatial assessment of the flow field, by taking account of the paths of the individual scattered particles and the color change along these paths.

What is claimed is:

1. A method for performing an analysis of a flow in a detection space, comprising the steps of:

detecting electromagnetic waves that one of: i) at least partially emanate from, and ii) are scattered by particles that are contained in the detection space and that characterize the flow;

generating at least two roughly parallel light sheets in accordance with the electromagnetic waves, the electromagnetic waves including one of: i) different frequencies, and ii) different frequency spectrums, the at least two light sheets of either different frequencies or different frequency spectrums being generated in temporal succession relative to one another;

arranging the at least two light sheets in spatial succession; and scanning the detection space at least in areas using the at least two light sheets.

2. The method according to claim 1, wherein:

the method is for one of a three-dimensional determination of a flow velocity component and a three-dimensional visualization of the flow in one of a fluid and a gas.

3. The method according to claim 1, wherein:

the electromagnetic waves are in the form of light of different colors in a visible frequency range.

4. The method according to claim 1, further comprising the step of:

recording the scanning of the detection space in accordance with an operation of at least one image detector.

5. The method according to claim 4, wherein:
the at least one image detector includes at least one CCD color camera.

6. The method according to claim 1, wherein:
the at least two light sheets are generated by a multicolored light beam using light of different colors.

7. The method according to claim 1, wherein:
the at least two light sheets are generated in temporal succession in accordance with light from at least two light sources, the light being one of different frequencies and of different frequency spectrums.

8. The method according to claim 6, wherein:
the multicolored light beam is used in one of a pulsed-mode operation and a continuous-wave operation.

9. The method according to claim 7, wherein:
the at least two light sources function in one of a pulsed-mode operation and a continuous-wave operation.

10. The method according to claim 4, wherein:
the at least two light sheets scan the detection space such that the at least one image detector records an illumination of the detection space, the illumination being at least approximately continuous in time.

11. The method according to claim 4, wherein:
the at least one image detector, during the scanning of the detection space, is one continuously readjusted and stepwise readjusted in a depth of focus thereof, such that the at least two light sheets form an image at a location of the at least one image detector that is, in each case, at least fairly sharp.

12. The method according to claim 1, wherein:
the scanning of the detection space includes at least two scannings of the detection space performed in rapid temporal succession.

13. The method according to claim 4, further comprising the step of
causing the at least one image detector to record a two-dimensional color image of the detection space, wherein:
in the two-dimensional color image a light that is one of emanating from and scattered by the particles is recorded by at least two sequential scannings of the detection space.

14. The method according to claim 4, further comprising the step of:
causing the at least one image detector to record a two-dimensional color image of the detection space, wherein:
a light that is one of emanating from and scattered by the particles is recorded in each case by at least one scanning of the detection space, in at least two images that are recorded in rapid succession.

15. The method according to claim 1, further comprising the step of:
evaluating an image of the detection space in accordance with one of a particle tracking algorithm and a correlation operation, including one of color information, a frequency, and frequency band information.

16. The method according to claim 1, wherein the detection space is a three-dimensional detection space, the method further comprising the step of:
determining at least one of a location of the particles, within a scanned area of the three-dimensional detection space, and a spatial shift of the particles from detected light as a function of time in accordance with an evaluation of a recorded, two-dimensional, color image of the detection space.

17. The method according to claim 16, further comprising the step of:
determining local flow velocities of the particles by taking into account a time duration between scanning processes.

18. A device for performing an analysis of a flow in a detection space, comprising:
an arrangement for detecting electromagnetic waves that one of: i) at least partially emanate from, and ii) are scattered by particles that are contained in the detection space and that characterize the flow;
at least one illuminating device for generating at least approximately parallel light sheets in accordance with the electromagnetic waves, the light sheets illuminating at least partially the detection space, and the electromagnetic waves including one of: i) different frequencies, and ii) different frequency spectrums, the at least one illuminating device generating the light sheets of either different frequencies or different frequency spectrums in temporal succession relative to one another;
an arrangement for arranging the light sheets in spatial succession; and
at least one detection device for recording two-dimensional images of at least one area of the detection space in one of: i) a frequency-selective manner, and ii) a frequency-band-selective manner.

19. The device according to claim 18, wherein:
the at least one illuminating device includes at least one light source for generating the electromagnetic waves in the form of light and to have one of the different frequencies and the different frequency spectrums.

20. The device according to claim 19, wherein:
the at least one light source includes a laser.

21. The device according to claim 18, further comprising:
a multicolored light source for generating light that can be split up into a plurality of colors in accordance with a frequency-sensitive component.

22. The device according to claim 21, wherein:
the multicolored light source includes a multicolored laser.

23. The device according to claim 21, wherein:
the frequency-sensitive component includes one of an acoustooptic modulator, a grating, and a prism.

24. The device according to claim 18, wherein:
the at least one illuminating device includes a collimator, a polygon scanner, and a galvanometer scanner.

25. The device according to claim 18, wherein:
the at least one detection device is positioned on at least one end face of the detection space.

26. The device according to claim 25, wherein:
the at least one end face includes an end face that is parallel to the light sheets.

27. The device according to claim 18, wherein:
the at least one detection device includes at least one color camera for recording the two-dimensional images of the detection space in color.

28. The device according to claim 27, wherein:
the at least one detection device includes a CCD color camera.

29. The device according to claim 27, wherein:
the at least one color camera includes an arrangement for adjusting a depth of focus.

30. The device according to claim 18, further comprising:
an evaluation unit for at least one of evaluating and storing the two-dimensional images.

31. A new method for performing an analysis of a flow in a detection space, comprising:
- detecting electromagnetic waves that one of: i) at least partially emanate from, and ii) are scattered by particles that are contained in the detection space and that characterize the flow;
- generating at least two roughly parallel light sheets in accordance with the electromagnetic waves, the electromagnetic waves including one of: i) different frequencies, or ii) different frequency spectrums, the at least two light sheets of either different sequences or different frequency spectrums being generated in temporal succession relative to one another and in spatial succession relative to one another; and
- scanning the detection space at least in areas using the at least two light sheets.

32. A device for performing an analysis of a flow in a detection space, comprising:
- an arrangement configured to detect electromagnetic waves that one of: i) at least partially emanate from, and ii) are scattered by particles that are contained in the detection space and that characterize the flow;
- at least one illuminating device configured to generate at least approximately parallel light sheets in accordance with the electromagnetic waves, the light sheets illuminating at least partially the detection space, and the electromagnetic waves including one of: i) different frequencies, or ii) different frequency spectrums, the at least one illuminating device configured to generate the light sheets of other different frequencies or different frequency spectrums in temporal succession relative to one another and in spatial succession relative to one another; and
- at least one detection device configured to record two-dimensional images of at least one area of the detection space in one of: i) a frequency-selective manner, or ii) a frequency-band-selective manner.

* * * * *